(12) United States Patent
Goodman et al.

(10) Patent No.: US 7,976,050 B1
(45) Date of Patent: Jul. 12, 2011

(54) SIDE-MOUNTABLE CHAIN-TENSIONING DEVICE FOR A LOAD-COMPENSATING TRAILER HITCH

(75) Inventors: Steven Goodman, Pender, NE (US); David Merchant, Lincoln, NE (US); James Huston, Yankton, SD (US); Les Roeber, Emerson, NE (US)

(73) Assignee: Automatic Equipment Mfg. Co., Pender, NE (US)

( * ) Notice: Subject to any disclaimer, the term of this patent is extended or adjusted under 35 U.S.C. 154(b) by 244 days.

(21) Appl. No.: 12/386,201

(22) Filed: Apr. 15, 2009

(51) Int. Cl.
*B60D 1/14* (2006.01)

(52) U.S. Cl. .................. 280/406.1; 280/455.1; 280/432; 280/405.1

(58) Field of Classification Search .............. 280/406.1, 280/455.1, 432, 405.1
See application file for complete search history.

(56) References Cited

U.S. PATENT DOCUMENTS

| | | | | |
|---|---|---|---|---|
| 3,649,046 A * | 3/1972 | Mathisen | .................. | 280/406.2 |
| 3,679,231 A * | 7/1972 | Derr, Jr. | .................... | 280/406.2 |
| 3,679,232 A * | 7/1972 | Weber | ........................ | 280/406.2 |
| 3,910,604 A | 10/1975 | Abromavage et al. | | |
| 3,989,269 A | 11/1976 | Rendessy | | |
| 4,025,085 A | 5/1977 | Jacobs | | |
| 4,053,174 A * | 10/1977 | Guettler, Jr. | ................ | 280/406.2 |
| 4,165,885 A | 8/1979 | Good et al. | | |
| 4,211,427 A | 7/1980 | Young et al. | | |
| 4,213,627 A * | 7/1980 | Thompson | .................. | 280/406.2 |
| 4,253,680 A * | 3/1981 | Albright et al. | ............ | 280/479.1 |
| 4,312,516 A | 1/1982 | Olsen | | |
| 4,722,542 A * | 2/1988 | Hensley | ........................ | 280/447 |
| 4,815,752 A * | 3/1989 | Young et al. | ............... | 280/406.2 |
| 5,465,991 A * | 11/1995 | Kass et al. | ..................... | 280/457 |
| 5,562,298 A | 10/1996 | Kass et al. | | |
| 5,580,076 A * | 12/1996 | DeRoule et al. | ........... | 280/406.2 |
| 5,660,409 A | 8/1997 | Hensley | | |
| 6,045,147 A * | 4/2000 | Schmidt et al. | ............ | 280/406.1 |
| 6,629,701 B1 * | 10/2003 | Colibert | ..................... | 280/455.1 |
| 6,860,501 B2 * | 3/2005 | Schmidt et al. | ............ | 280/455.1 |

* cited by examiner

*Primary Examiner* — Anne Marie Boehler
*Assistant Examiner* — Michael Stabley
(74) *Attorney, Agent, or Firm* — Donald R. Schoonover

(57) ABSTRACT

A tensioning device for connecting a trailer to a spring bar of a load-compensating apparatus includes a body unit for securement to a frame member of a trailer; a reel unit having an off-center hub portion with a slot and rotatively secured to the body unit about a pivot axis; a rotation-limiting element which limits rotation of the reel unit to approximately 180° about the pivot axis; a linked chain having a proximal end thereof releasably secured to the slot of the off-center hub portion and a distal end thereof connected to the spring bar of the load-compensating apparatus; a latching element including a biased latch pin; and a lug and removable handle for rotating the reel portion to, and the latching element releasably locks the reel portion in, a chain-tensioned configuration.

11 Claims, 3 Drawing Sheets

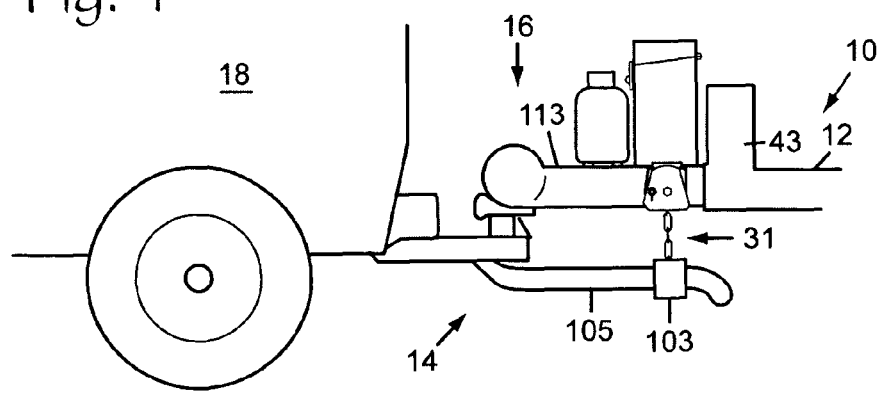
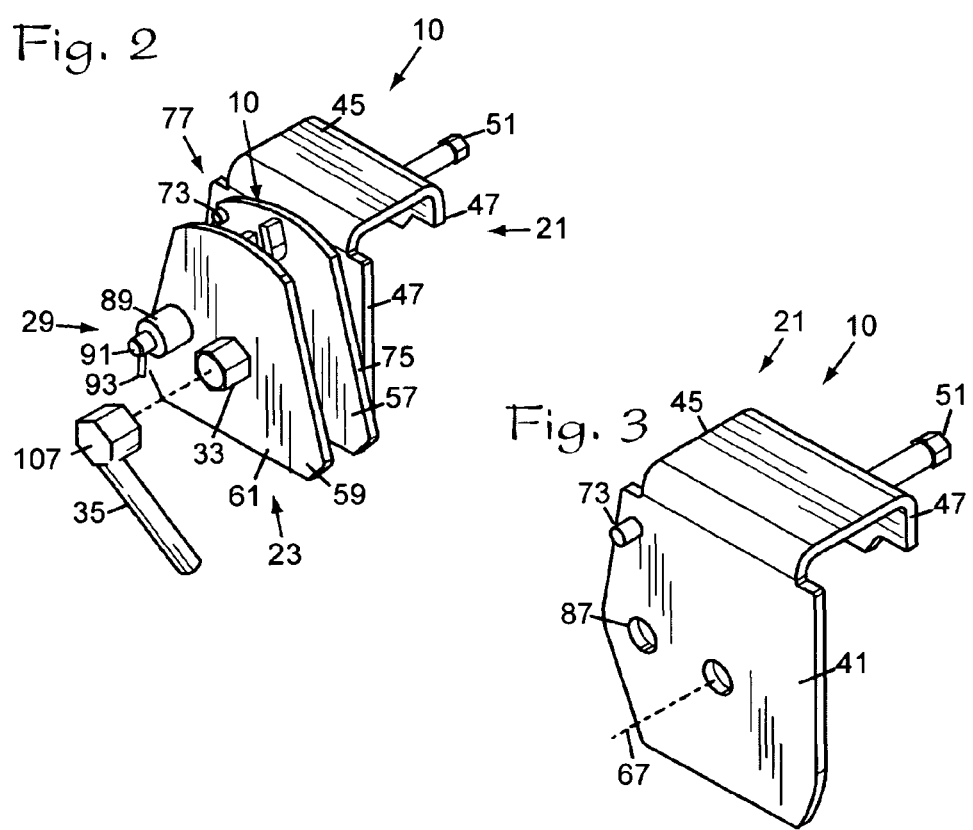

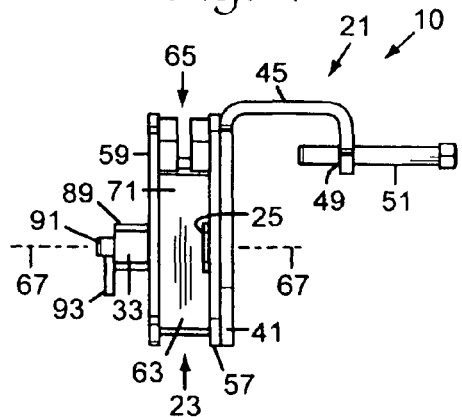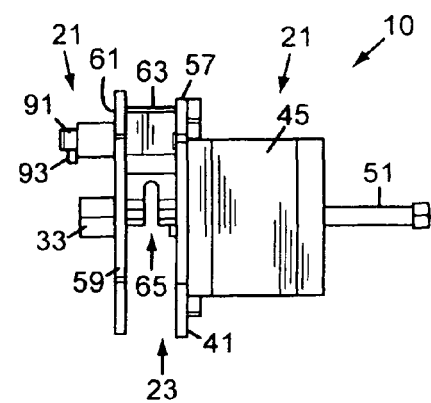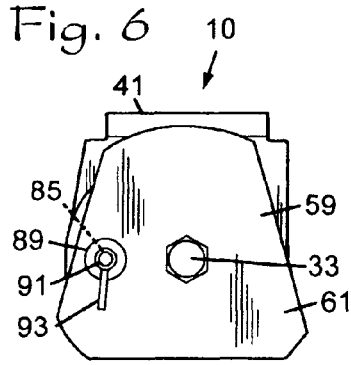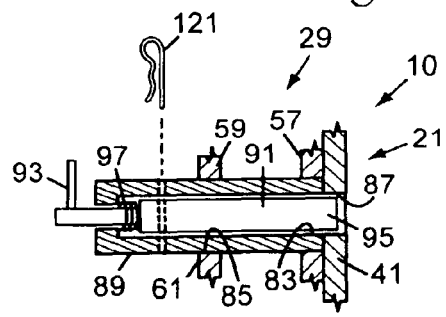

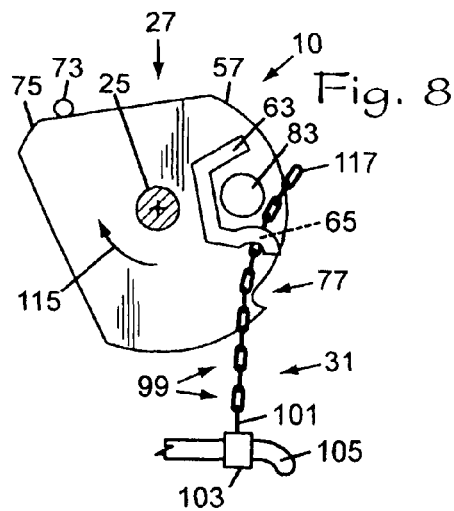
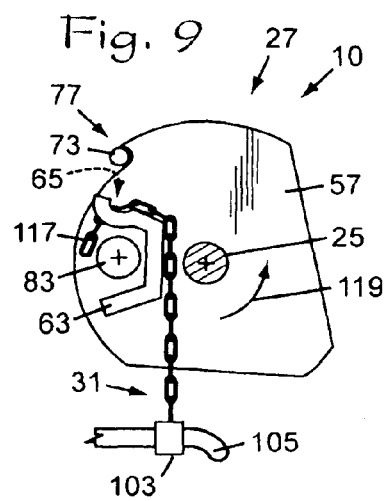
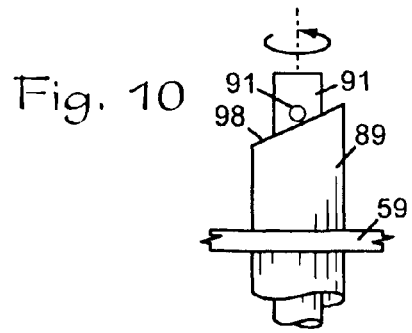
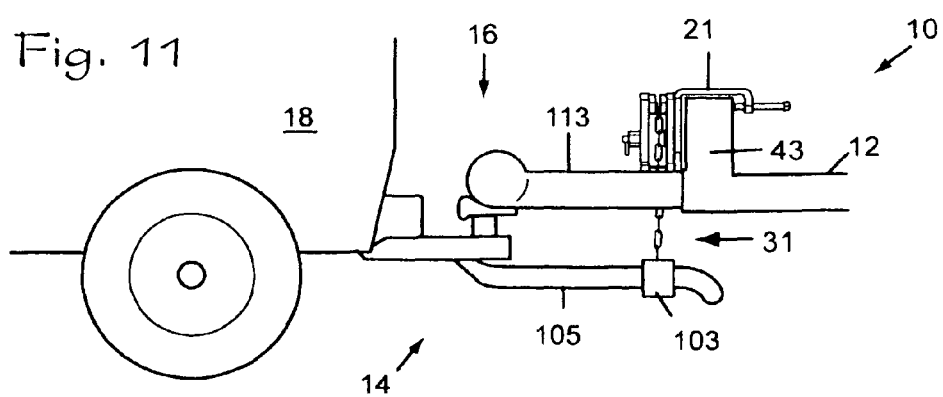

SIDE-MOUNTABLE CHAIN-TENSIONING DEVICE FOR A LOAD-COMPENSATING TRAILER HITCH

BACKGROUND OF THE INVENTION

1. Field of the Invention

The present invention relates to trailer hitches and, more specifically without limitation, to load-compensating trailer hitches.

2. Description of the Related Art

Vehicles, such as flat-bed trailers, horse trailers, and the like, collectively referred to herein as "trailers", are commonly towed behind a towing vehicle. The force with which the tongue of the trailer bears down on the towing hitch arrangement of the towing vehicle, sometimes referred to as tongue weight, must be maintained between certain permissible limits. Otherwise, improper distribution of the load in the trailer between the towing hitch arrangement and the axle or axles supporting the trailer may cause the trailer to sway back and forth as the trailer is being pulled along a roadway. Further, if such limits are not properly heeded, the ability of the operator to reliably control steering and stability of the towing vehicle may be seriously jeopardized.

For some applications, it may be difficult, or even impossible to properly distribute a trailer load relative to the towing hitch arrangement and the supporting axle(s) of the trailer. Further, even if the load is properly distributed prior to beginning the towing of the trailer, the cumulative effects of rough underlying surfaces, sharp turns, and fast stops may cause the load to shift and dynamically re-distribute itself during the towing process, whereby the weight distribution between the towing hitch arrangement and the trailer axle(s) is no longer within desired weight and balance criteria.

Some towing hitch arrangements are fitted with an opposing pair of spring bars extending rearwardly toward the trailer, which establish a desired load-leveling, weight-distributing relationship between the towing hitch arrangement and the trailer axle(s) even if the trailer load does shift and become undesirably dynamically redistributed while the loaded trailer is being towed. The spring bars perform the load-leveling, weight-distributing function by applying a moment between the trailer and the towing hitch arrangement about a transverse axis which opposes the tongue weight of the trailer. Unfortunately, the amount of access generally available for tensioning devices for such load-leveling, weight-distributing hitches is very limited due to the minimal available space being used for other purposes, such as cover plates, propane tanks, tool boxes, and other obstructions.

What is needed is a side-mounted chain-tensioning device that can be conveniently and easily used in conjunction with load-compensating trailer hitches for trailers having limited access space for such hitches.

SUMMARY OF THE INVENTION

The improvements of the present invention for a pair of side-mounted tensioning devices, each tensioning device being releasably connectable to a respective one of a pair of spring bars of a load-compensating apparatus for connecting a trailer to a towing vehicle. Each of the tensioning devices includes a body unit, a reel unit, a pivot pin, a rotation-limiting element, a latching element, a chain, a lug and a wrench.

The body unit includes either a vertically-oriented base portion with bolt holes for securement to a frame member of a trailer or, alternatively, a body unit having a vertically-oriented base portion, an upper portion, and a lip portion with a clamping device, wherein the body unit is dimensioned to straddle, and be clamped to, the frame member of the trailer.

The reel unit includes inner and outer reel portions rigidly secured together by an off-center hub portion with a slot. A pivot pin rotatively secures the inner reel portion to rotate about a pivot axis relative to the base portion.

The rotation-limiting element includes a stop pin secured to the base portion, and the inner reel portion having a profiled peripheral edge and a notch, wherein the inner reel portion interacts with the stop pin to limit rotation of the inner reel portion about the pivot axis to approximately 180°.

The latching element includes aligned first and second sleeve orifices through the inner and outer reel portions that are alignable with a latching orifice through the base portion, and a biased latch pin slidably mounted in a sleeve extending through the first and second sleeve orifices and fixedly secured to the inner and outer reel portions, wherein the latch pin includes a distal end that is extendable into the latching orifice when the sleeve is aligned with the latching orifice. The sleeve may have an inclined surface to assist a user to manually withdraw the latch pin from the latching orifice.

The chain includes a plurality of links dimensioned to be releasably insertable into the slot of the off-center hub portion and a distal end with a connector releasably connectable to the respective spring bar of the load-compensating trailer hitch.

The lug is fixedly secured to the outer surface of the outer reel portion, and the low-profile handle has a socket portion which is removably and non-rotatively securable to the lug.

In use, a tongue member of the trailer is connected to the towing vehicle, with each body unit secured side-mounted to a frame member of the trailer, with the reel unit rotated clockwise until the profiled peripheral edge of the inner reel portion abuttingly engages the stop pin, with a link of the chain removably inserted into the slot, and with the connector of the chain removably connected to the respective spring bar of the towing hitch arrangement, the handle and lug are used to cooperatively rotate the reel unit counter-clockwise about the pivot axis to tension the chain over the off-set hub until the notch abuttingly engages the stop pin and the distal end of the latching pin is biased into the latching orifice of the base portion with the chain depending downwardly between the off-center hub portion and the pivot axis, thereby locking the chain in a tensioned configuration.

PRINCIPAL OBJECTS AND ADVANTAGES OF THE INVENTION

The principal objects and advantages of the present invention include: providing a chain-tensioning device that can be conveniently and easily used in conjunction with load-compensating hitches for trailers having limited access space for such hitches; providing such a chain-tensioning device that is side-mountable to a frame member of the trailer; providing such a chain-tensioning device that includes a reel with an off-set hub; and generally providing such a chain-tensioning device that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a reduced side elevational view of a side-mountable chain-tensioning device for a load-compensating trailer hitch mounted to a tongue member of a trailer, according to the present invention.

FIG. 2 is a fragmentary, perspective view of the side-mountable chain-tensioning device for a load-compensating trailer hitch.

FIG. 3 is a perspective view of a body unit of the side-mountable chain-tensioning device for a load-compensating trailer hitch.

FIG. 4 is a fragmentary, side elevational view of the side-mountable chain-tensioning device for a load-compensating trailer hitch.

FIG. 5 is a fragmentary, top plan view of the side-mountable chain-tensioning device for a load-compensating trailer hitch.

FIG. 6 is a fragmentary, front elevational view of the side-mountable chain-tensioning device for a load-compensating trailer hitch.

FIG. 7 is an enlarged cross-sectional and schematic representation of a latch pin of the side-mountable chain-tensioning device for a load-compensating trailer hitch.

FIG. 8 is a front elevational view of a reel portion of the side-mountable chain-tensioning device for a load-compensating trailer hitch, showing an outer reel portion removed for reasons of clarity and showing an inner portion thereof rotated clockwise about a pivot axis with a profiled peripheral edge thereof abuttingly engaging a stop pin.

FIG. 9 is a front elevational view similar to FIG. 8, but showing the inner reel portion rotated counter-clockwise about the pivot axis with a notch of the profiled peripheral edge thereof abuttingly engaging the stop pin.

FIG. 10 is an enlarged side elevational view of an alternative sleeve of the side-mountable chain-tensioning device for a load-compensating trailer hitch.

FIG. 11 is a reduced side elevational view similar to FIG. 1, but showing the side-mountable chain-tensioning device for a load-compensating trailer hitch mounted to a front frame member of the trailer, according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a pair of side-mountable tensioning devices, each such device 10 structured and configured to connect a trailer 12 to a respective one of a pair of spring bars of a load-compensating apparatus 14 of a towing hitch arrangement 16 of a towing vehicle 18 in accordance with the present invention, as shown in FIGS. 1 through 11. Each side-mountable tensioning device 10 includes a body unit 21, a reel unit 23, a pivot pin 25, a rotation-limiting element 27, a latching element 29, a connecting element 31 such as a chain 31 for example, a non-circular lug 33, and a handle 35.

The body unit 21 includes a vertically-oriented base portion 41 that is positionable alongside a side frame member 43 near the front end of the trailer 12. It is to be understood that, for some applications of the present invention wherein absence of obstructing equipment such as tool boxes, propane tanks, etc., permits, it may be desirable to position the base portion 41 alongside a front frame member of the trailer 12, as shown in FIG. 11.

The body unit 21 may also include an horizontally-oriented upper portion 45 that extends rearwardly from the base portion 41 and a lip portion 47 that extends downwardly from the upper portion 45, as shown in FIG. 3, and has a tapped orifice 49 therethrough, as indicated in FIG. 4. The body unit 21 is dimensioned to straddle the frame member 43 of the trailer 12, as shown in FIG. 11. The body unit 21 further includes a threaded clamping device 51, as shown in FIGS. 4 and 5, that mates with the tapped orifice 49 wherein the front frame member 43 of the trailer 12 is clampable between the base and lip portions 41, 47 by threadably advancing the clamping device 51 relative to the tapped orifice 49.

Alternatively, the body unit 21 may consist of the base portion 41 being a flat plate with mounting holes suitable for accepting bolts for securing the body unit 21 to the trailer frame member 43, as indicated in FIG. 11, which would eliminate the need for the upper and lip portions 45, 47 of the body unit 21.

The reel unit 23 includes an inner reel portion 57, an outer reel portion 59 having an outer surface 61, and an off-center hub portion 63 having a slot 65 and rigidly securing the outer reel portion 59 to the inner reel portion 57, as shown in FIG. 4.

The pivot pin 25 rotatively secures the inner reel portion 57 to the base portion 41 to rotate about a pivot axis 67, as shown in FIG. 4, the pivot axis 67 being oriented perpendicularly to the base portion 41.

The rotation-limiting element 27 includes a stop pin 73 secured to the base portion 41, and the inner reel portion 57 having a profiled peripheral edge 75 and a notch 77, wherein the inner reel portion 57 is dimensioned to be abuttingly engageable with the stop pin 73. The components of the rotation-limiting element 27 are dimensioned wherein rotation of the inner reel portion 57 about the pivot axis 67 between an abutting engagement between the stop pin 73 and the notch 77, as shown in FIGS. 2 and 9, and an abutting engagement between the stop pin 73 and the profiled peripheral edge 75, as shown in FIG. 8, is limited to approximately 180°.

The latching element 29 includes a first sleeve orifice 83 through the inner reel portion 57, a second sleeve orifice 85 through the outer reel portion 59 and aligned with the first sleeve orifice 57, and a latching orifice 87 through the base portion 41, wherein the latching orifice 87 is alignable with the first and second pin orifices 83, 85, as shown in FIG. 7. The latching element 29 also includes a sleeve 89 extending through the first and second sleeve orifices 83, 85 and fixedly secured to the inner and outer reel portions 57, 59. The latching element 29 further includes a latch pin 91 having a grip portion 93, and slidably mounted in the sleeve 89, wherein the latch pin 91 has a distal end 95 extendable into the latching orifice 87 when the sleeve 89 is aligned with the latching orifice 87. The latching element 29 further includes a biasing mechanism 97, such as a coil spring 97 for example, that biases the latch pin 91 toward the base portion 41.

Alternatively, the sleeve 89 may have an inclined outer surface 98, as shown in FIG. 10, which can be used to assist manual withdrawal of the distal end 95 of the latch pin 91 from the latching orifice 87 by rotating the grip portion 93 against the inclined outer surface 98.

The chain 31 includes a plurality of links 99 dimensioned to be releasably insertable into the slot 65 of the off-center hub portion 63, and a distal end 101 with a connector 103 that is releasably connectable to a spring bar 105 of the towing hitch arrangement 16 of the towing vehicle 18.

The non-circular lug 33, which is fixedly secured to the outer surface 61 of the outer reel portion 59, as shown in FIG. 6, is axially aligned with the pivot axis 67 of the pivot pin 25. The handle 35 is low-profiled and L-shaped with a socket portion 107 that is removably and non-rotatively securable to the lug 33. For example, the lug 33 may be hex-shaped and the handle 35 may be an off-set or ratchet socket wrench 35 with a one-inch drive.

In an application of the present invention, a tongue member 113 of the trailer 12 is connected to the towing hitch arrangement 16 of the towing vehicle 18. Each body unit 21 of a pair of the side-mountable tensioning devices 10 is bolted or clamped to an appropriate frame member of the trailer 12 above a respective one of the spring bars of the load-compensating trailer hitch. Each side-mounted tensioning device 10 is then installed as described below.

The distal end 95 of the latch pin 91 is withdrawn from the latching orifice 87 and the reel unit 23 is rotated clockwise approximately 180° about the pivot axis 67 until the profiled peripheral edge 75 of the inner reel portion 57 abuttingly engages the stop pin 73, as indicated by the arrow designated by numeral 115 in FIG. 8. The connector 103 of the chain 31 is removably connected to the respective spring bar 105 of the towing hitch arrangement 16 of the towing vehicle 16 and a link 117 of the chain 31 is inserted in the slot 65 of the off-set hub portion 63.

The handle 35 is then used in conjunction with the lug 33 to rotate the reel unit 23 counter-clockwise about the pivot axis 67 until the notch 77 abuttingly engages the stop pin 73, as indicated by the arrow designated by numeral 119 in FIG. 9, with the biasing mechanism 97 automatically biasing the distal end 95 of the latch pin 91 into the latching orifice 87, thereby tensioning the chain 31 over the hub portion 71 and locking the reel unit 23 and chain 31 in the tensioned configuration with the chain 31 depending downwardly between the off-center hub portion 63 and the pivot axis 67, as shown in FIG. 9.

The disposition of the tensioned chain 31 depending downwardly between the off-center hub portion 63 and the pivot axis 67 ensures that, in the event that the distal end 95 of the latch pin 91 should become dislodged from the latching orifice 87 while the trailer 12 is being towed, the moment created between the tensioned chain 31 and the pivot axis 67 will continue urging the notch 77 of the profiled peripheral edge 75 of the inner reel portion 57 into abutting engagement with the stop pin 73.

As an added safety precaution, the latching element 29 may include a cotter-type pin 121 inserted through appropriately spaced orifices through the sleeve 89 and latch pin 91 to thereby prevent the distal end 95 of the latch pin 91 from becoming dislodged from the latching orifice 87 as the trailer 12 is being towed.

If the resulting tensioning of the spring bar 105 does not enable desired load-compensation, the grip portion 93 of the latch pin 91 may be used to withdraw the distal end 95 of the latch pin 91 from the base portion 41 and the handle 35 used to unwind the chain 31 from the off-center hub portion 63 to thereby release the tensioning of the spring bar 105. Then, the chain link 115 currently in the slot 65 can be removed from the slot 65 and a different chain link 115 that is closer to, or farther from, the connector 103, as needed, can be inserted into the slot 65 and the tensioning procedure repeated until the desired tensioning of the spring bar 105 is obtained.

It is to be understood that while certain forms of the present invention have been illustrated and described herein, it is not to be limited to the specific forms or arrangement of parts as described and shown.

What is claimed and desired to be covered by Letters Patent is as follows:

1. A tensioning device for connecting a trailer to a spring bar of a load-compensating apparatus of a towing vehicle, the tensioning device comprising:
   (a) a body unit having a vertically-oriented base portion secured to a frame member of said trailer;
   (b) a reel unit including an off-center hub portion, the reel unit being rotatively secured to the base portion about a pivot axis oriented perpendicularly to the base portion;
   (c) a rotation-limiting element structured wherein rotation of the reel unit is limited to approximately 180° about the pivot axis;
   (d) a connecting element having a proximal end thereof releasably secured to the off-center hub portion and a distal end thereof connected to said spring bar of said load-compensating apparatus of said towing vehicle;
   (e) a latching element including a latch pin structured to releasably lock the reel portion in a tensioned configuration; and
   (f) a lug and a handle with a socket portion, the lug being secured to the reel portion and the socket portion being removably securable to the lug; and
   (g) wherein the reel portion is rotatable to, and releasably lockable by the latching element in, the tensioned configuration.

2. A tensioning device as defined in claim 1, wherein the body unit includes a vertically-oriented base portion positionable alongside said frame member of said trailer, an horizontally-oriented upper portion extending rearwardly from the base portion, and a lip portion extending downwardly from the upper portion, wherein the body unit is dimensioned to straddle said frame member of said trailer.

3. A tensioning device as defined in claim 2, wherein the lip portion includes a tapped orifice therethrough and the body unit includes a threaded clamping device that mates with the tapped orifice, wherein said frame member of said trailer is clampable between the base and lip portions of the body unit by threadably advancing the clamping device relative to the tapped orifice.

4. A tensioning device as defined in claim 1, wherein the reel unit further includes an inner reel portion, an outer reel portion having an outer surface, and the off-center hub portion includes a slot dimensioned to releasable secure the distal end of the connecting element to the hub portion.

5. A tensioning device as defined in claim 1, wherein a pivot pin rotatively secures an inner reel portion to the base portion to rotate about the pivot axis.

6. A tensioning device as defined in claim 1, wherein:
   (a) the off-set hub portion includes a slot; and
   (b) the connecting element includes a chain having a plurality of links dimensioned to be releasably insertable into the slot of the off-set hub portion.

7. A tensioning device for connecting a trailer to a load-compensating apparatus of a towing vehicle, the tensioning device comprising:
   (a) a body unit including a vertically-oriented base portion and positionable alongside a frame member of said trailer, an horizontally-oriented upper portion extending rearwardly from the base portion, a lip portion extending downwardly from the upper portion and having a tapped orifice therethrough, and a threaded clamping device that mates with the tapped orifice, wherein the body unit is dimensioned to straddle said frame member of said trailer and to clamp said frame member between the base and lip portions of the body unit by threadably advancing the clamping device relative to the tapped orifice;

(b) a reel unit including an inner reel portion, an outer reel portion having an outer surface, and an off-center hub portion having a slot and rigidly securing the outer reel portion to the inner reel portion;

(c) a pivot pin rotatively securing the inner reel portion to the base portion to rotate about a pivot axis;

(d) a rotation-limiting element including:
   (1) a stop pin secured to the base portion; and
   (2) the inner reel portion having a profiled peripheral edge and a notch, the inner reel portion dimensioned to be abuttingly engageable with the stop pin; and
   (3) wherein rotation of the inner reel portion between an abutting engagement between the stop pin and the notch, and an abutting engagement between the stop pin and the profiled peripheral edge, is limited to approximately 180°;

(e) a latching element including:
   (1) a first pin orifice through the inner reel portion;
   (2) a second pin orifice through the outer reel portion and aligned with the first pin orifice;
   (3) a latching orifice through the base portion wherein the latching orifice is alignable with the first and second pin orifices;
   (4) a sleeve fixedly secured to the outer surface of the outer reel portion and aligned with the second pin orifice; and
   (5) a latch pin having a grip portion and slidably mounted in the sleeve and through the first and second pin orifices, the latch pin including a distal end extendable into the latching orifice when the first and second pin orifices are aligned with the latching orifice, the latching element further including a biasing mechanism that biases the latch pin toward the base portion;

(f) a chain having a plurality of links dimensioned to be releasably insertable into the slot of the off-center hub portion, and a distal end with a connector releasably connectable to said spring bar of said load-compensating apparatus of said towing vehicle;

(g) a non-circular lug fixedly secured to the outer surface of the outer reel portion, the lug being axially aligned with the pivot axis of the pivot pin; and (h) a low-profile L-shaped handle having a socket portion removably and non-rotatively securable to the lug; and (i) wherein, with a tongue member of said trailer connected to said towing vehicle, with the body unit straddling said frame member of said trailer and secured thereto with the clamping device, with the reel unit rotated clockwise until the profiled peripheral edge of the inner reel portion abuttingly engages the stop pin, with a link of the chain removably inserted into the slot, and the connector of the chain removably connected to said spring bar of said towing vehicle, the handle and lug can be used to cooperatively rotate the reel unit counter-clockwise about the pivot axis thereby tensioning the chain over the off-set hub until the notch abuttingly engages the stop pin and the biasing mechanism biases the distal end of the latching pin into the latching orifice of the base portion with the chain depending downwardly between the off-center hub portion and the pivot axis thereby locking the chain in a tensioned configuration.

8. A tensioning device for connecting a trailer to a spring bar of a load-compensating apparatus of a towing vehicle, the tensioning device comprising:

(a) a body unit having a vertically-oriented base portion secured to a frame member of said trailer;

(b) a reel unit including an off-center hub portion, the reel unit being rotatively secured to the base portion about a pivot axis;

(c) a rotation-limiting element structured wherein rotation of the reel unit is limited to approximately 180° about the pivot axis, the rotation-limiting element including:
   (1) a stop pin secured to the base portion, and
   (2) an inner reel portion having a profiled peripheral edge and a notch, the inner reel portion being dimensioned to be abuttingly engageable with the stop pin,
   (3) wherein rotation of the inner reel portion between an abutting engagement between the stop pin and the notch, and an abutting engagement between the stop pin and the profiled peripheral edge, is limited to approximately 180°;

(d) a connecting element having a proximal end thereof releasably secured to the off-center hub portion and a distal end thereof connected to said spring bar of said load-compensating apparatus of said towing vehicle;

(e) a latching element including a latch pin structured to releasably lock the reel portion in a tensioned configuration; and (f) a lug and a handle with a socket portion, the lug being secured to the reel portion and the socket portion being removably securable to the lug; and (g) wherein the reel portion is rotatable to, and releasably lockable by the latching element in, the tensioned configuration.

9. A tensioning device for connecting a trailer to a spring bar of a load-compensating apparatus of a towing vehicle, the tensioning device comprising:

(a) a body unit having a vertically-oriented base portion secured to a frame member of said trailer;

(b) a reel unit including an off-center hub portion, the reel unit being rotatively secured to the base portion about a pivot axis;

(c) a rotation-limiting element structured wherein rotation of the reel unit is limited to approximately 180° about the pivot axis;

(d) a connecting element having a proximal end thereof releasably secured to the off-center hub portion and a distal end thereof connected to said spring bar of said load-compensating apparatus of said towing vehicle;

(e) a latching element including a latch pin structured to releasably lock the reel portion in a tensioned configuration, the latching element including:
   (1) a first pin orifice through an inner reel portion,
   (2) a second pin orifice through an outer reel portion and aligned with the first pin orifice,
   (3) a latching orifice through the base portion wherein the latching orifice is alignable with the first and second pin orifices,
   (4) a sleeve fixedly secured to the outer surface of the outer reel portion and aligned with the second pin orifice, and
   (5) a latch pin having a grip portion and slidably mounted in the sleeve and through the first and second pin orifices, the latch pin including a distal end extendable into the latching orifice when the first and second pin orifices are aligned with the latching orifice, the latching element further including a biasing mechanism that biases the distal end of the latch pin toward the base portion; and (f) a lug and a handle with a socket portion, the lug being secured to the reel portion and the socket portion being removably securable to the lug; and (g) wherein the reel portion is rotatable to, and releasably lockable by the latching element in, the tensioned configuration.

10. A tensioning device as defined in claim 9, wherein the sleeve includes an inclined outer surface wherein the distal end of the latch pin is withdrawable from the latching orifice by rotating the grip portion against the inclined outer surface.

11. A tensioning device for connecting a trailer to a spring bar of a load-compensating apparatus of a towing vehicle, the tensioning device comprising:

(a) a body unit having a vertically-oriented base portion secured to a frame member of said trailer;

(b) a reel unit including an off-center hub portion, the reel unit being rotatively secured to the base portion about a pivot axis;

(c) a rotation-limiting element structured wherein rotation of the reel unit is limited to approximately 180° about the pivot axis;

(d) a connecting element having a proximal end thereof releasably secured to the off-center hub portion and a distal end thereof connected to said spring bar of said load-compensating apparatus of said towing vehicle;

(e) a latching element including a latch pin structured to releasably lock the reel portion in a tensioned configuration;

(f) a lug and a handle with a socket portion, the lug being secured to the reel portion and the socket portion being removably securable to the lug; and (g) a tensioning device, the lug being axially aligned with the pivot axis;

(h) wherein the reel portion is rotatable to, and releasably lockable by the latching element in, the tensioned configuration.

\* \* \* \* \*